US007137458B2

(12) United States Patent
Yung

(10) Patent No.: US 7,137,458 B2
(45) Date of Patent: Nov. 21, 2006

(54) IMPACT MECHANISM FOR A HAMMER DRILL

(75) Inventor: Kai-Leung Yung, Kowloon (HK)

(73) Assignee: The Hong Kong Polytechnic University, Sar (CN)

( * ) Notice: Subject to any disclaimer, the term of this patent is extended or adjusted under 35 U.S.C. 154(b) by 41 days.

(21) Appl. No.: 10/986,174

(22) Filed: Nov. 12, 2004

(65) Prior Publication Data

US 2006/0102364 A1 May 18, 2006

(51) Int. Cl.
*B23B 45/02* (2006.01)
*B25D 11/10* (2006.01)

(52) U.S. Cl. ...................... 173/101; 173/117; 173/205; 173/217

(58) Field of Classification Search .................. 173/48, 173/101, 103, 105, 117, 203, 205, 217, 93.7, 173/109
See application file for complete search history.

(56) References Cited

U.S. PATENT DOCUMENTS 1,613,555 A * 1/1927 Boyd ......................... 175/319
2,564,224 A * 8/1951 Mitchell et al. ........... 173/93.6
2,968,960 A * 1/1961 Fulop .......................... 173/48
3,133,601 A * 5/1964 Fulop .......................... 173/97
4,316,513 A * 2/1982 Harris ......................... 173/91
4,867,251 A * 9/1989 Isenring ....................... 173/98
5,653,294 A 8/1997 Thurler ........................ 173/48
6,550,546 B1 4/2003 Thurler et al. ................ 173/48

* cited by examiner

*Primary Examiner*—Stephen F. Gerrity
*Assistant Examiner*—Paul Durand
(74) *Attorney, Agent, or Firm*—Jacobson Holman PLLC

(57) ABSTRACT

An impact mechanism for a hammer drill, which has a housing and a drill bit protruding outside the housing, is provided. The mechanism includes firstly an impact platform within the housing; the impact platform is in connection with the drill bit for receiving impact forces and for transferring the impact forces to the drill bit. The mechanism also has a plurality of cams within the housing, and the plurality of cams are angularly spaced apart and arranged about an axis of rotation. The mechanism further includes a plurality of hammers placed within the housing and interactable with both the impact platform and the plurality of cams. The plurality of hammers are angularly spaced apart and arranged about the axis of rotation, and each hammer is capable of reciprocating along the axis for exerting the impact forces on the impact platform. Each of the plurality of cam is driven to interact with each of the plurality of hammers alternatively such that the plurality of hammers are driven to reciprocate along the axis so as to generate the impact forces.

8 Claims, 4 Drawing Sheets

IMPACT MECHANISM FOR A HAMMER DRILL

BACKGROUND

1. Field of the Invention

The present invention relates to hammer drills, and more particularly, to an impact mechanism for a hammer drill.

2. Background of the Invention

When drilling through hard surfaces such as rocks or stone, many times it is desirable to impart a reciprocating motion to the drill bit to facilitate drilling. This hammering motion of the drill bit helps break up the material while the rotating of the drill bit allows the broken up material to be removed from the hole being drilled.

A primary disadvantage associated with existing impact mechanisms for hammer drills is the fact that in order to accomplish a desired high blows per minute (BPM) for efficient hammer drill performance, an undesirable high output speed is required. High BPM can also be achieved by increasing the number of ramps on the impact mechanism. However, an increased number of impact ramps tend to produce a "skipping" effect and efficiency loss due to the smaller area of surface contact for each ramp.

OBJECT OF THE INVENTION

It is, therefore, an object of the present invention to provide an improved impact mechanism for a hammer drill that accomplishes desired high blows per minute (BPM) without requiring an undesirable high output speed, or at least provide the public with a useful choice.

SUMMARY OF THE INVENTION

According to an aspect of the present invention, an impact mechanism for a hammer drill, which has a housing and a drill bit protruding outside the housing, includes firstly an impact platform within the housing. The impact platform is in connection with the drill bit for receiving impact forces and for transferring the impact forces to the drill bit. The mechanism also has a plurality of cams within the housing, and the plurality of cams are angularly spaced apart and arranged about an axis of rotation. The mechanism further includes a plurality of hammers placed within the housing and interactable with both the impact platform and the plurality of cams. The plurality of hammers are angularly spaced apart and arranged about the axis of rotation, and each hammer is capable of reciprocating along the axis for exerting the impact forces on the impact platform. Each of the plurality of cam is driven to interact with each of the plurality of hammers alternatively such that the plurality of hammers are driven to reciprocate along the axis so as to generate the impact forces.

According to another aspect of the present invention, a hammer drill includes a housing;

a drill bit protruding outside the housing; and an impact mechanism, including

- an impact platform within the housing, the impact platform being in connection with the drill bit for receiving impact forces and for transferring the impact forces to the drill bit;
- a plurality of cams within the housing, the plurality of cams being angularly spaced apart and arranged about an axis of rotation; and

- a plurality of hammers placed within the housing and interactable with both the impact platform and the plurality of cams, the plurality of hammers being angularly spaced apart and arranged about the axis of rotation, each hammer being capable of reciprocating along the axis for exerting the impact forces on the impact platform, wherein each of the plurality of cam is driven to interact with each of the plurality of hammers alternatively such that the plurality of hammers are driven to reciprocate along the axis so as to generate the impact forces.

Other aspects and advantages of the invention will become apparent from the following detailed description, taken in conjunction with the accompanying drawings, which description illustrates by way of example the principles of the invention.

DETAILED DESCRIPTION

Figure 1:
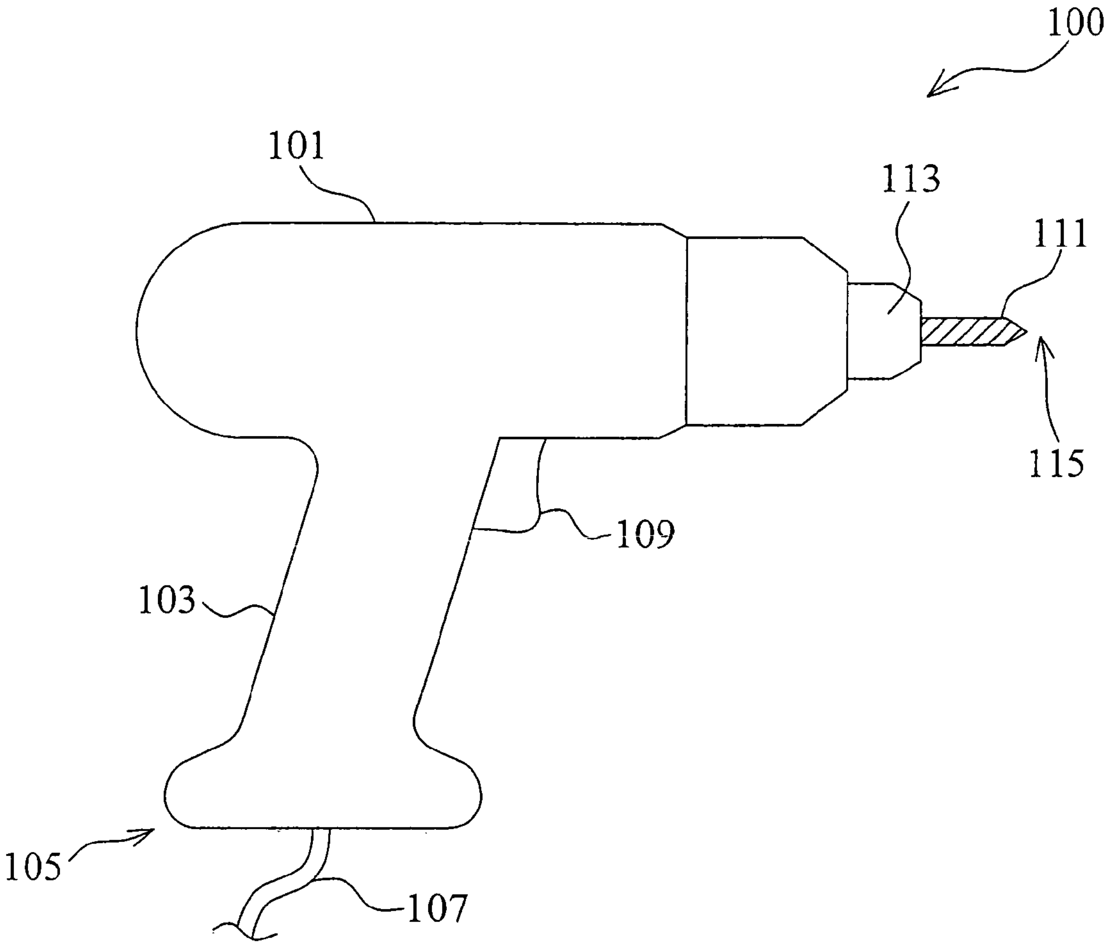
FIG. 1 is a side elevation view of a hammer drill in which an exemplary embodiment of the present invention can be used.

As shown in FIG. 1, an exemplary hammer drill 100 includes a housing 101 having a pistol grip handle 103. The lower end 105 of housing 101 receives an electrical cord 107. The electrical cord 107 is adapted to be connected to a suitable power source (not shown) that powers a motor (not shown) within the housing 101. In the case of a battery-powered hammer drill, the electrical cord 107 will be internal and connected to a battery instead. The cord 107 is in circuit with a trigger switch 109 on the handle 103 of housing 101. Of course, the present invention is equally useful with a battery powered cordless hammer drill. The trigger switch 109 selectively supplies power to the motor. A suitable speed control device (not shown) for controlling motor speed can also be included in a circuit connected to trigger switch 109, if so desired. A drill bit 111, protruding outside the housing 101 and held by a drill chuck 113, can be driven to rotate for drilling through a workpiece (not shown). Furthermore, in the exemplary embodiment, a front end 115 is defined as the end of drill bit 111, and a front direction is defined as a direction towards the front end.

Figure 2:
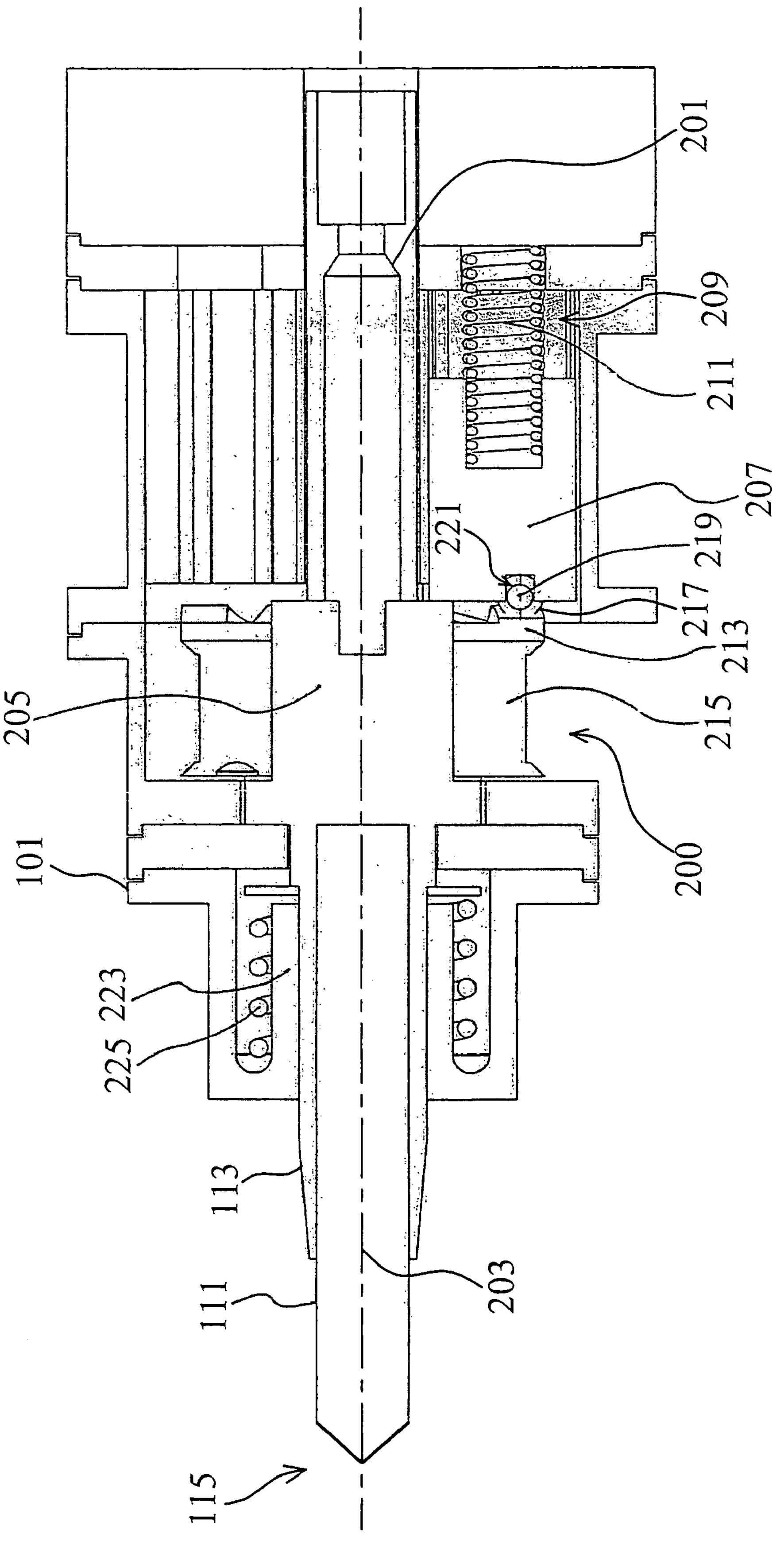
FIG. 2 is a cross section view of an impact mechanism in accordance with an exemplary embodiment of the present invention, which can be used in the drill of FIG. 1.
Figure 3:
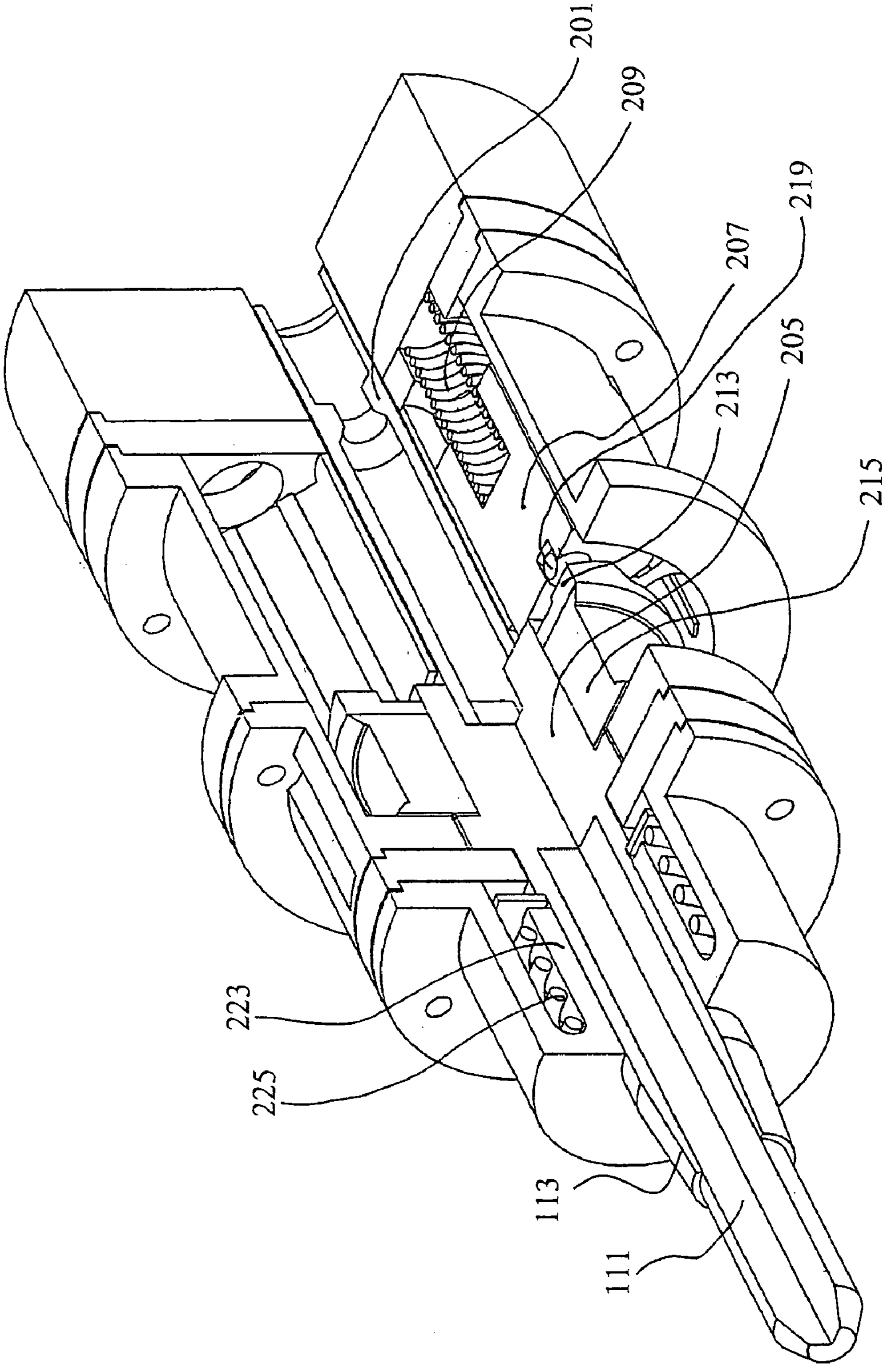
FIG. 3 is an exposed perspective view of the impact mechanism of FIG. 1.

In FIGS. 2 and 3, an exemplary impact mechanism embodiment 200 of the present invention is placed inside the housing 101 and firstly has a rotational shaft 201 in connection with the motor (not shown) at one end either directly or through a gear train (not shown) as generally understood. At the other end, the shaft 201 is connected to the drill bit 111, and thereby the drill bit 111 can be driven to rotate about an axis 203 for the drilling purpose.

An impact platform 205, mounted co-axially with the rotational shaft 201 in the exemplary embodiment, is placed inside the housing 101 and behind the drill bit 111. The impact platform 205 receives impact forces and further transmits such forces to the drill bit 111 for drilling purposes.

A plurality of angularly spaced apart hammers 207 is placed inside the housing 101 and behind the impact platform 205 for striking on the platform 205 alternatively to exert an impact force thereon individually. The hammers 207 are arranged to circle the axis 203, and each hammer 207 may reciprocate parallel to the axis 203 within a longitudinal chamber 209. Furthermore, a plurality of compression springs 211 are provided inside the chambers 209, and each is connected to the backside of its respective hammer 207 and biases the hammer 207 towards the impact platform 205 for exerting the impact force.

A cam disc 213, secured atop a ring 215, is co-axially mounted with the impact platform 205, with a plurality angularly spaced apart cams 217 mounted thereon. Thus, as the platform 205 rotates with the rotating shaft 201, the cam disc 213 also rotates such that each cam 217 sequentially interacts with the hammers 207. As a result, each hammer 207 is raised and then falls due to the spring force to strike on the platform 205 individually.

A plurality of steel balls 219 is provided, with each being rotatably retained in a hole 221 at an end of its respect hammer 207 between the hammer 207 and the cam disc 213 for reducing friction forces therebetween.

The impact platform 205 and the drill chuck 113 are held by a bearing 223 to the housing 101 but are allowed to rotate and move forward and backward freely. The positions of the impact platform 205 and the drill chuck 113 are held back by a spring 225 such that as the impact forces are exerted on the platform 205, the drill chuck 113 and the drill bit 111 will shock forward producing a chiseling action before being held back to their original positions by the spring 225. The spring 225 eliminates the need for holding the platform 205 back to receive the impact by forcing the drill bit hard against the surface to be drilled as compared to conventional designs. This brings more convenience to the user in that conventionally, a large force is generally required by the user to press the drill against the surface to be drilled for the impact ramps to be effective.

Furthermore, this forward shock action produced by the hammers 207 happens at two position of the rise and fall cycle of the hammers 207; firstly when the cam 217 on the cam disc 213 becomes in contact with the steel ball 221 producing an upward shock of the hammer 207, and the counteraction of such shock on the cam disc 213 is transmitted as an forward shock through the cam disc 213 to the chuck 113 that holds the drill bit 111; the second position is when a hammer 207 strikes on the impact platform 205, which transmits the impact energy as a forward chiseling action to the drill bit 111.

The design of the impact platform 205, the cam disc 213, the ring 215 and the hammers 207 is such that when a hammer 207 strikes on the impact platform 205 while none of the cams 217 is in contact with the steel ball 219 of this hammer 207, there is a sufficient clearance between the steel ball 219 and both this hammer 207 and the cam disc 205 to allow no contact therebetween. This allows this particular hammer 207 to strike on the platform 205.

Figure 4:
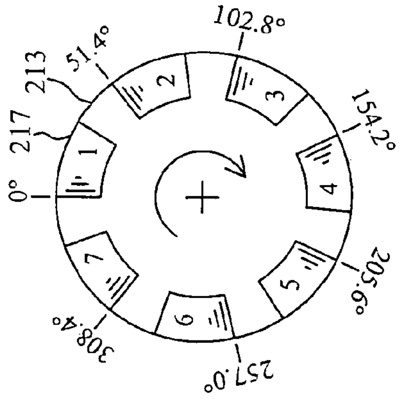
FIG. 4 is a top plan view of a cam disc, which is a part of the impact mechanism of FIG. 2.
Figure 5:
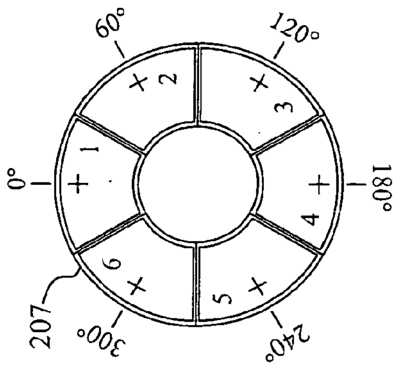
FIG. 5 is a bottom plan view of a plurality of hammers, which are part of the impact mechanism of FIG. 2.
Figure 6:
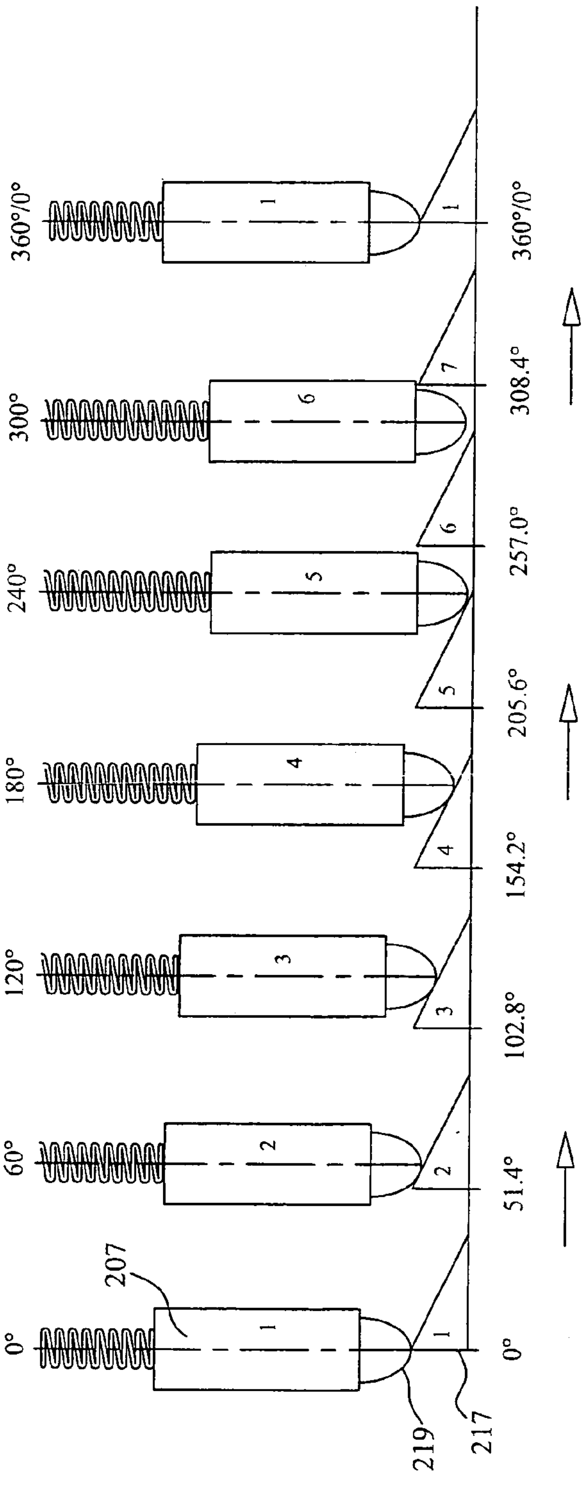
FIG. 6 is a set of side elevation views illustrating various rise and fall cycles of the hammers of FIG. 5.

In the exemplary embodiment, the number of cams 217 is one more than the number of hammers 207. Specifically, an example of 6 radially positioned hammers 207 and a cam disc 213 with 7 cams 217 are used to demonstrate the principle as shown in FIGS. 4 and 5. When the cam disc 213 rotates, each hammer 207 will be at a different state of the rise and fall cycle as shown in FIG. 6. For each rotation of 51.4 degrees of the cam disc 213, each of the 6 hammers 207 will complete a rise and fall cycle but at a different phase. Therefore, the impact platform 205 will receive 6 hammer strikes within the 51.4 degrees of rotation of the cam disc 213 but at equal time slots apart. Consequently, during that 51.4 degrees ($1/7^{th}$ of a rotation) rotation of the cam disc 213, there will be 6 cam hits, one at each of the 6 hammers in order to raise them respectively. Summing all these together, for one complete revolution of the cam disc 213, there will be all together 6×7=42 rise and fall cycles of the hammers 207 where each cycle produces a hammer against cam contact pulse at the cam disc 213, and an impact pulse at the impact platform 205 generated by the hammer strikes. These two pulses, one at the cam disc 213 due to the counteraction caused by the interaction between the cams and the hammers and the other at the impact platform 205, are both transmitted to the impact platform 205 and then to the drill bit 111 as a forward shock to produce a maximum total of 84 shocks at the drill bit 111 per revolution of the cam disc 213. Hence, for the design of in which the cam disc 213 and ring 215 are fixedly mounted to the impact platform 205, there can be 84 blows per revolution of the drill bit 111. However, it is understood that if the cam disc 213 rotates at a relatively slow speed, the counteraction on the came disc 213 may not be significant enough such that a blow actually occurs at this position. In such a case, there will be 6×7=42 blows caused by the hammers 207 striking on the platform 205.

In addition, the interaction between the hammers and the cams happen in a sequential manner such that each rise and fall cycle of each hammer overlaps with the interactions of the other hammers and cams hence allowing more time for the rise and fall hammer to acquire more momentum for a bigger impact and minimizing the skipping problem at high rotation speed of the cam disc.

Various alternatives can be made to the exemplary embodiment as generally understood by the people in the art. For example, the design also caters for cases where the BPM is required to be independent of the rotation speed of the drill bit 111. In this case, the ring 215 can be a pulley which allows to rotate freely from impact platform 205, and is driven by an externally driven belt (not shown) so that the speed and direction of rotation of the cam disc 213 can be independent of the drill bit 111. In addition, the ring 215 together with the cam disc 213 can be detached from the impact platform 205 and be driven (rotate) by a belt (not shown) independently.

What is claimed is:

1. An impact mechanism for a hammer drill, the hammer drill having a housing, the impact mechanism comprising an impact platform inside the housing, the impact platform being in connection with a drill bit for receiving impact forces and for transferring the impact forces to the drill bit;

a plurality of cams placed inside the housing; and a plurality of hammers located inside the housing, each hammer being capable of reciprocation for exerting an impact force on the impact platform, wherein each of the cams is driven to interact with each of the hammers alternately such that the plurality of hammers are driven to reciprocate so as to generate the impact forces to the impact platform, both the plurality of cams and the plurality of hammers being angularly spaced apart and arranged about an axis of rotation, a cam disc rotatable about the axis of rotation and with the plurality of cams disposed on the cam disc, wherein rotation of the cam disc drives each of the cams to interact with each of the hammers sequentially, and the plurality of cams and the plurality of hammers configured such that each of at least some of the hammers being in interaction with one of the cams at a different state of a rise or fall cycle.

2. The mechanism of claim 1, further comprising at least one spring within the housing for biasing the plurality of hammers towards the platform such that at least one of the plurality of hammers is driven towards the impact platform for generating an impact force when the at least one of the plurality of hammers is not in interaction with any of the plurality of cams.

3. The mechanism of claim 1, wherein the hammers and the cams interact in a sequential manner such that each rise and fall cycle of one of the hammers overlaps with the interactions between at least part of the other hammers and cams for providing said hammer with a longer rise and fall cycle to acquire a higher momentum.

4. The mechanism of claim 1, wherein the cam disc is connected to the platform such that the interaction between at least one of the plurality of hammers and its respective cam is transformed to the platform as an impact force.

5. The mechanism of claim 1, wherein n number of cams and m number of hammers are provided, and wherein the mechanism can exert up to n*m*2 number of impacts on the impact platform during a complete rotation of the cam disc.

6. The mechanism of claim 5, wherein n and m are unequal.

7. The mechanism of claim 5, wherein n=m+1.

8. The mechanism of claim 1, further comprising a spring provided inside the housing for biasing the platform in a direction away from the drill bit to receive the impact forces from the hammers.

* * * * *